United States Patent
Kawamura

(10) Patent No.: US 6,600,828 B1
(45) Date of Patent: Jul. 29, 2003

(54) IMAGE PROCESSING METHOD AND APPARATUS, AND STORAGE MEDIUM THEREFOR

(75) Inventor: Naoto Kawamura, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/318,819

(22) Filed: May 26, 1999

(30) Foreign Application Priority Data

May 29, 1998 (JP) .......................................... 10-149499
May 14, 1999 (JP) .......................................... 11-134058

(51) Int. Cl.[7] ................................................. G06K 9/00
(52) U.S. Cl. ..................................................... 382/100
(58) Field of Search ............................... 382/100, 232, 382/263, 251; 713/176; 381/73.1; 380/252; 375/381

(56) References Cited

U.S. PATENT DOCUMENTS

| | | | | |
|---|---|---|---|---|
| 4,760,541 A | * | 7/1988 | Weygandt et al. | 382/103 |
| 5,848,155 A | * | 12/1998 | Cox | 380/202 |
| 6,094,722 A | * | 7/2000 | Astola et al. | 713/176 |
| 6,097,847 A | * | 8/2000 | Inoue | 382/263 |
| 6,137,892 A | * | 10/2000 | Powell et al. | 382/100 |
| 6,208,735 B1 | * | 3/2001 | Cox et al. | 713/176 |
| 6,233,347 B1 | * | 5/2001 | Chen et al. | 382/100 |
| 6,425,082 B1 | * | 7/2002 | Matsui et al. | 382/283 |

OTHER PUBLICATIONS

Bender et al., Techniques for data hiding, IBM Systems Journal, vol. 35, Nos. 3 and 4, 1996.*

* cited by examiner

Primary Examiner—Amelia M. Au
Assistant Examiner—Martin Miller
(74) Attorney, Agent, or Firm—Fitzpatrick, Cella, Harper & Scinto

(57) ABSTRACT

When additional information is embedded into image data, both image quality and tolerance are improved. The image processing method includes the steps of: providing a plurality of pixels or a plurality of spatial-frequency components into which additional information is to be embedded; and changing the data value of the plurality of embedding pixels or spatial-frequency components in accordance with a value corresponding to the data value of the spatial-frequency components in order to embed the additional information.

26 Claims, 11 Drawing Sheets

| a | b |
|---|---|
| c | d |

FIG. 2

| 101 | 105 |
|---|---|
| 123 | 80 |

FIG. 3

| 2 | 2 |
|---|---|
| 2 | 1 |

FIG. 4A

| 0 | 0 |
|---|---|
| -1 | 0 |

FIG. 4B

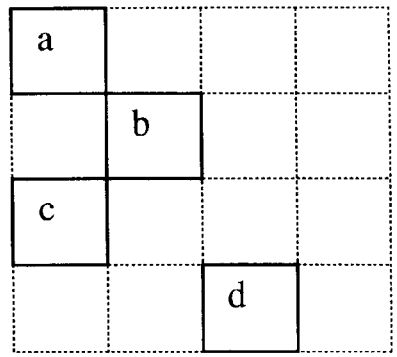
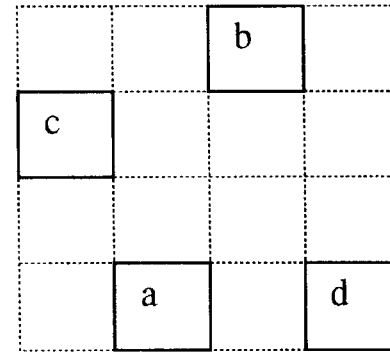
FIG. 5A							FIG. 5B
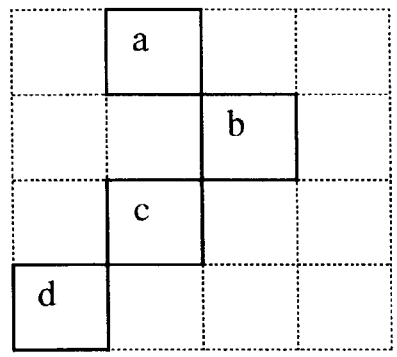
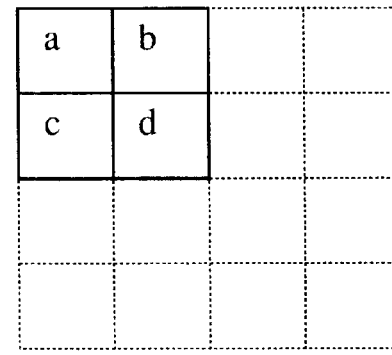
FIG. 5C							FIG. 5D

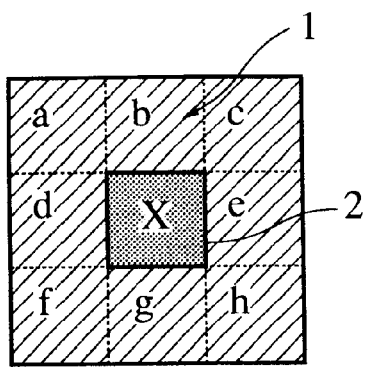
FIG. 12A
FIG. 12B
FIG. 12C
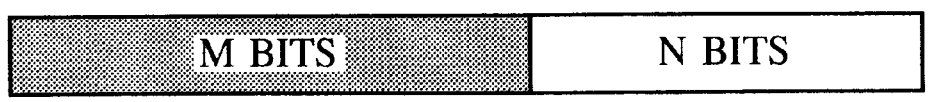
FIG. 13

IMAGE PROCESSING METHOD AND APPARATUS, AND STORAGE MEDIUM THEREFOR

BACKGROUND OF THE INVENTION

1. Field of the Invention

The present invention relates to an image processing method and apparatus which add information to digital image data without causing considerable damage thereto, and to a storage medium therefor.

2. Description of the Related Art

Hitherto, regarding electronic watermark technologies, various methods have been developed as methods for protecting the copyright of digital content. These methods have attracted attention as security and copyright protection technologies in the electronic distribution industry, in which handling information of digital content, such as the name of the owner of the copyright and the identification (ID) of the purchaser, is embedded in the digital information of the image in such a manner as to be difficult for the human eye to see, making it possible to track unauthorized use of illegal copies.

In these electronic watermark technologies, various methods have been proposed as methods for embedding data. As one of the methods, there is a method for embedding information in the least significant bit of the digital image data. In this method, bits are embedded in digitized image data X (or the spatial-frequency data thereof), and when 1-bit information (0 or 1) is embedded in the image data, the least significant bit (LSB) of the image data is changed according to whether the information to be embedded is 0 or 1. For example, when the image data is the decimal value 101, the binary representation thereof is the image data (1100101). When it is determined in advance that when the value to be embedded is "0", the LSB is set to 0, and when the value to be embedded is "1", the LSB is set to 1, the watermark information is embedded in the LSB of the image data. More specifically, when embedding information "0" and "1", the image data become (1100100) and (1100101), respectively. Such embedded information is obtained by reading these image data and by extracting the LSB. Although this method is simple, the embedded information may be lost when an error is mixed into the image data and when image processing is performed on the image data. For example, when 1-bit error information is added to the image data, the information embedded in the LSB is directly affected. Also, when gray-scale processing, for example, gamma conversion, is performed on the image, the LSB value is often varied. In other words, embedded information can be easily removed or changed by this processing, that is, this method is said to be weak in tolerance for practical use.

In order to solve this problem, there is a method for causing image data to have strong tolerance by requantizing the image data. Referring to FIG. 1, a description is given of such a method which requantizes image data X, by an incremental amount defined as width h, at a specified place. More specifically, referring to FIG. 1, the image data X is assumed to be divided into steps of width h. If the image data is assumed to be the decimal value 101 and the width h is assumed to be 4, the image data can be 4, 8, 12, 16 . . . , 100, 104, and so on. Candidates for requantizing the value 101 of the image data are therefore 100 and 104. Accordingly, the rule described below is applied.

When embedding information "0", quantization is performed to an even-numbered requantization value. When embedding information "1", quantization is performed to an odd-numbered requantization value. The requantization value 100 is odd-numbered at 4×25 and the requantization value 104 is even-numbered at 4×26. Therefore, since quantization is performed to an even-numbered value when the embedding information is "0", in accordance with the above-described rule, the value is requantized to 104, and since quantization is performed to an odd-numbered value when the embedding information is "1", the value is requantized to 100.

In order to detect the embedded information using the above-described requantization method, the requantized image data is divided by width h in order to obtain a quotient.

Accordingly, the embedded information is detected by using a rule (2) which satisfies the following two conditions: when the quotient is an odd number the embedding information is "1", and when the quotient is an even number the embedding information is "0". For example, when image data are 100 and 104, by dividing such data by width 4, the following are obtained:

Since 100/4=25 is an odd number, the embedding information is "1", and since 104/4=26 is an even number, the embedding information is "0".

Here, if the width h for requantization is set to be larger, error tolerance is improved. For example, if 1-bit error information is mixed into the image data after requantization, the data 100 becomes 101 or 99, and the data 104 becomes 105 or 103.

Accordingly, the rule (2) is changed as described below to a rule (3) which satisfies the following two conditions:

If the quotient in round figures is an odd number, the embedding information is "1".

If the quotient in round figures is an even number, the embedding information is "0".

Using the above rule (3), by dividing the read image data by width 4, the following can be obtained:

Since the values [101/4]=25 and [99/4]=25 are odd numbers, the embedding information is "1".

Since the values [105/4]=26 and [103/4]=26 are even numbers, the embedding information is "0". Therefore, it is possible to obtain watermark information having strong error tolerance. Here, the width h for requantization can be used differently as a parameter which provides the intensity of error tolerance according to the intended use. Since the same value must be used during embedding and during detection, the value of the width h is managed as key information.

In such a method, by varying the width h, embedding with strong tolerance is possible. However, such a method has the following problems.

(1) If the width h is set to be larger, the tolerance is improved but image quality deteriorates.

(2) If the width h is set to be smaller, image quality is improved but the tolerance deteriorates.

Therefore, image quality and tolerance are in a trade-off relationship; if one of them is improved, the other deteriorates, and it is not possible to improve both.

SUMMARY OF THE INVENTION

It is an object of the present invention to solve the above-described problems.

It is another object of the present invention to embed information in such a manner that deterioration in image quality is small.

It is a further object of the present invention to provide an image processing method and apparatus which are suitable for detecting embedded information with high accuracy, and a storage medium therefor.

It is a still further object of the present invention to provide an information embedding method having high tolerance.

It is a still further object of the present invention to provide an information embedding method having novel functions, and a storage medium therefor.

To achieve the above-mentioned objects, according to one aspect of the present invention, there is provided an image processing method for embedding additional information into image data, the image processing method comprising the steps of: providing a plurality of pixels or a plurality of spatial-frequency components into which additional information is to be embedded; and changing the data value of the plurality of embedding pixels or spatial-frequency components in accordance with a value corresponding to the data value of the plurality of embedding pixels or spatial-frequency components in order to embed the additional information.

According to another aspect of the present invention, there is provided an image processing method in which a spatial area or a spatial-frequency area of image data is divided into a determination area and an embedding area, and information is embedded only in the embedding area which is regarded as an area in which deterioration in image quality is small on the basis of the determination result of the determination area. In such a method, by adaptively performing an embedding operation according to the image quality, deterioration can be reduced and tolerance can be improved. Such a method is simple, exhibits a small deterioration in image quality and has excellent tolerance, and since the amount of features of an image are extracted and information is embedded according to that amount, individual embedded position information need not be passed during detection.

The above and further objects, aspects and novel features of the invention will become more apparent from the following detailed description when read in connection with the accompanying drawings.

BRIEF DESCRIPTION OF THE DRAWINGS

FIG. 2 illustrates an operation for embedding additional information according to an embodiment of the present invention.

FIG. 3 shows a specific example of the operation of FIG. 2.

FIGS. 4A and 4B show additional information in a manner corresponding to FIG. 2.

FIGS. 5A, 5B, 5C, and 5D show examples of the pixels in which additional information is embedded.

FIGS. 12A, 12B, and 12C show examples of provided image data in another embodiment of the present invention.

FIG. 13 shows bit distribution used for determination within image data.

DETAILED DESCRIPTION OF THE PREFERRED EMBODIMENTS

First Embodiment

Figure 1:
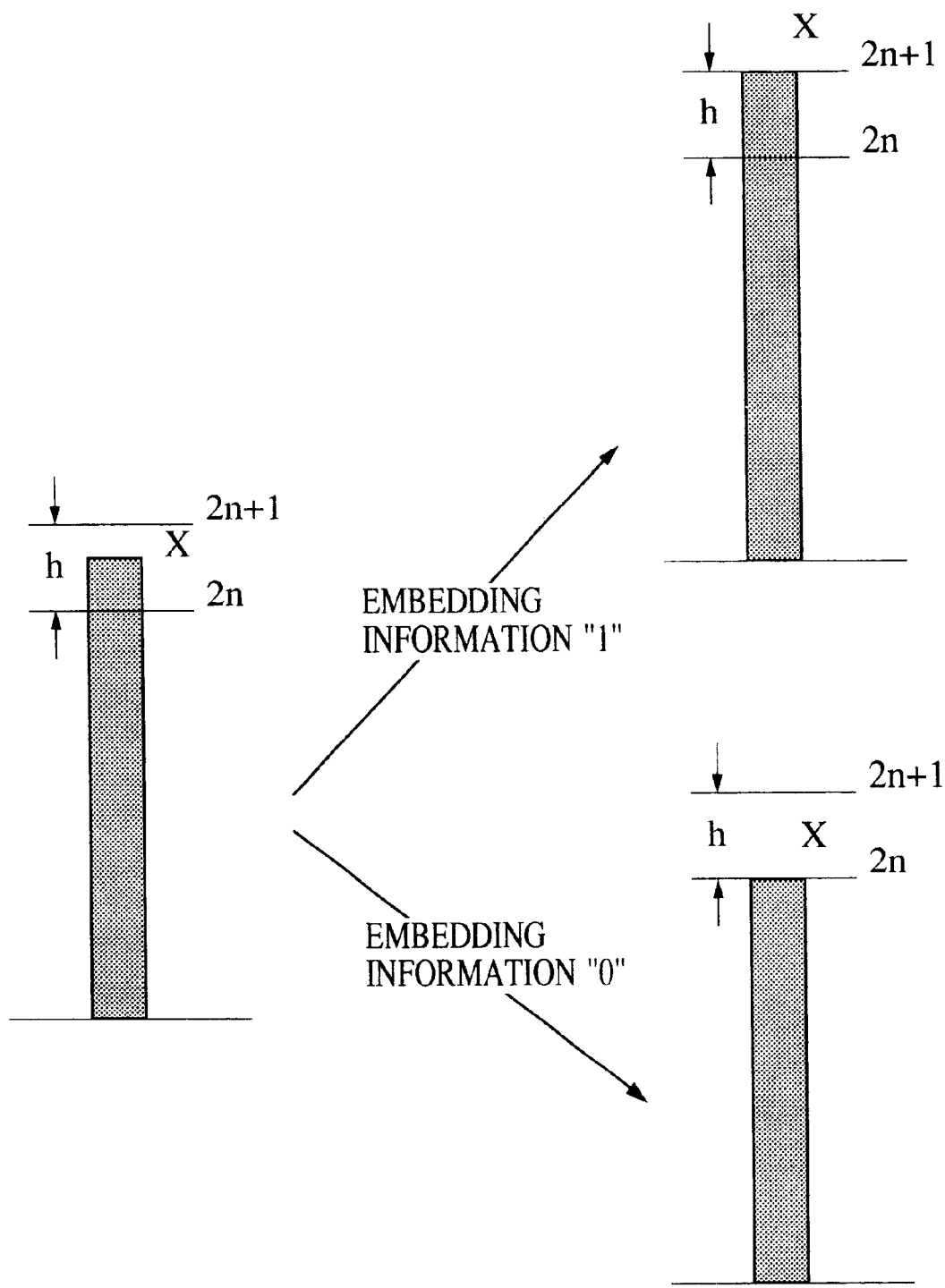
FIG. 1 illustrates a conventional additional information embedding method.

FIG. 2 shows a case in which one bit of embedding information is embedded to a combination of pixel data of four pixels (or four spatial-frequency components). Here, 2×2 block of adjacent pixels (or spatial-frequency components) a, b, c, and d are selected. Data to be embedded is targeted to the sum of the data of the four pixels, that is, a+b+c+d. For example, if it is assumed that the image data is a=101, b=105, c=123, and d=80, as shown in FIG. 3, then a+b+c+d=409. Here, assuming the width h for requantization to be 4, and applying it to the added result, the requantization levels are 4, 8, 12, 16, . . . , 408, 412, . . . , and candidates for requantizing the value 409 of the addition data are 408 and 412. Accordingly, a rule (4) described below is applied.

When the embedding information is "0", quantization is performed to an even-numbered requantization value.

When the embedding information is "1", quantization is performed to an odd-numbered requantization value. The requantization value 408 is even-numbered at 4×102 and the requantization value 412 is odd-numbered at 4×103. Therefore, when the embedding information is "0", the value is requantized to the even-numbered 408, and when the embedding information is "1", the value is requantized to the odd-numbered 412. The method for distributing the value after being requantized to each of the pixels a, b, c, and d is as described below. A difference (+3 or −1) between the value of the above-described addition data and the requantization value is distributed in the following manner.

(A) When the embedding information is "0", the value becomes 408, and the difference becomes −1.
The new pixel values become: a=101, b=105, c=122, and d=80.
(B) When the embedding information is "1", the value becomes 412, and the difference becomes +3.
The new pixel values become: a=102, b=106, c=124, and d=80.

Here, the four pixel values in the descending order of the values of the pixels are varied in steps of one until the above-described difference is satisfied.

A method for detecting embedded data is described below. Image data which is converted in this manner is read, the addition image data is divided by width h, and a rule (5) formed of the following two conditions is applied.

When the quotient in round figures is an odd number, the embedding information is determined to be "1".

When the quotient in round figures is an even number, the embedding information is determined to be "0".

Using the above rule (5), by dividing the read addition image data by width 4, the following are obtained.

(A) Since [412/4]=103 is an odd number, the embedding information is "1".
(B) Since [408/4]=102 is an even number, the embedding information is "0".

Regarding the error tolerance, if a 1-bit error is mixed in the 2×2 block, in the case of (A), 407 or 409 is a result in which an error is mixed, and in the case of (B), 413 or 411 is a result in which an error is mixed. In both cases, the information can be detected by the above-described rule (3), and a result can be obtained in which the intensity of the tolerance corresponds to the width h for requantization. Here, the value of each pixel is varied by only ±1, and the image deterioration is visually small. In this manner, generally, as a result of sharing the amount of change by requantization over a plurality of pixels, the image deterioration is visually small.

Second Embodiment

When the width h for requantization in the first embodiment is changed to 8, the data after being requantized become 8, 16, 32, . . . , 408, 416, . . . , and candidates for requantizing the above-described addition data value 409 are 408 and 416. Since the requantization value 408 is odd-numbered at 8×51 and the requantization value 416 is even-numbered at 8×52, when the embedding information is "0", the value is requantized to 416 (because the value is even-numbered), and when the embedding information is "1", the value is requantized to 408 (because the value is odd-numbered). The distribution of a difference D (+7 or −1) between the addition value and the requantization value among the pixels a, b, c, and d is performed in the following manner.

(A) When the embedding information is "0", the value becomes 416, and the difference D becomes +7.
The amounts of addition are: Δa=2, Δb=2, Δc=2, and Δd=1
The new pixel values become a=103, b=107, c=125, and d=81.
(B) When the embedding information is "1", the value becomes 408, and the difference D becomes −1.
The amounts of addition are: Δa=0, Δb=0, Δc=−1, and Δd=0.
The new pixel values are: a=101, b=105, c=122, and d=80.

FIGS. 4A and 4B show the respective amounts of change for each pixel in the above-described examples. The distribution of this difference D is determined by the following rule (6):

Assuming that Δ=value of width h for requantization/the number of pixels, the difference D is added (subtracted) by Δ in sequence in the descending order of the values of the pixels of the image.

Finally, a residual is provided to set D to 0.

In the case of the above-described example (A), since the difference D=+7, assuming that Δ=8/4=2, addition is performed by 2 in the sequence of the pixels c, b, a, and d. Additions of 2, 2, and 2 are performed in the sequence of the pixels c, b, and a, and the remaining 1 is applied to d. In the case of (B), since the difference D=−1, subtraction of 1 should be performed in the sequence of the pixels c, b, a, and d. However, since the amount of change is 1, the subtraction of 1 is performed only on the pixel c.

Here, the sequence of application pixels is made to be in the descending order of the image data values. The reason for this is that the greater the ratio, the smaller the ratio to the amount of change and the smaller the deterioration of the image quality. In the case of the second embodiment, the tolerance is improved by an amount corresponding to the increase of the width h for requantization in comparison with the first embodiment. In the second embodiment, addition is performed with the same weight with respect to each of a, b, c, and d. Furthermore, addition in which a weight ($P_i$) is varied may be used, such as $P_1 a + P_2 b + P_3 c + P_4 d$.

Third Embodiment

The continuous 2×2 pixels (or spatial-frequency components) a, b, c, and d in a similar manner to the second embodiment are selected. Here, for the sake of description, the image data is set: $X_1=c$, $X_2=b$, $X_3=a$, and $X_4=d$. This order is denoted as $X_i$, and as the addition data, the value of $X_1-X_2+X_3-X_4$ (equation 7) is used as a target. When such conversion is performed on the image data of FIG. 3, the following are obtained:

$$a=101, b=105, c=123, d=80$$

$$X_1=123, X_2=105, X_3=101, X_4=80$$

$$X_1-X_2+X_3-X_4=123-105+101-80=39$$

If the width h for requantization is 4, 36 and 40 are candidates, and in a similar manner to the above-described case, (A) When the embedding information is "0", the requantization value becomes 40 (an even-numbered value), and the difference D becomes +1.
(B) When the embedding information is "1", the requantization value becomes 36 (an odd-numbered value), and the difference D becomes −3.

The distribution of the difference D is performed in the following manner. If the difference value of $X_i$ is denoted as $D_i$, based on equation (7), $$\text{Requantization value}=(X_1+D_1)-(X_2-D_2)+(X_3+D_3)-(X_4-D_4) \quad (8)$$

$$=X_1-X_2+X_3-X_4+D_1+D_2+D_3+D_4 \quad (9)$$

The new pixel values becomes: $(X_1+D_1)$, $(X_2-D_2)$, $(X_3+D_3)$, and $(X_4-D_4)$ \quad (10)

When this is applied to the above-described (A) and (B), using equation (6),
(A) When the embedding information is "0", the requantization value becomes 40 (an even-numbered value), the difference D=+1, and $D_1=1$.
Therefore, since a computation of difference is performed starting from the pixel having the largest value, the new pixel values become: $X_1=124$, $X_2=105$, $X_3=101$, and $X_4=80$
(B) When the embedding information is "1", the requantization value becomes 36 (an odd-numbered value), the difference D=−3, $D_1=-1$, $D_2=-1$, and $D_3=-1$.
Therefore, the new pixel values become: $X_1=122$, $X_2=106$, $X_3=100$, and $X_4=80$.

The features of the third embodiment are that, since a difference value is provided based on equation (10) with respect to the pixels extracted into 2×2 blocks, a local density is substantially maintained. That is, as can be seen in the example of (B), since an amount of change of each pixel is given, for example, as an increase or decrease of −1 for $X_1$, +1 for $X_2$, and −1 for $X_3$, the difference between the average data of four pixels after processing of this embodiment is performed and the average data before processing is smaller than that of the second embodiment, and the deterioration in image quality is further reduced.

Fourth Embodiment

FIG. 5 shows an embodiment in which target pixels are apart from each other. In the above-described embodiment, data is embedded by using adjacent pixels, as shown in FIG. 2. A number of methods of the arrangement of four pixels are conceivable, as shown in FIGS. 5A, 5B, 5C, and 5D. In the case of the electronic watermark technology of this embodiment, in order to prevent decryption, by introducing the information of the pixel arrangement as a parameter, the information becomes more complex and becomes difficult to decrypt. This pixel arrangement information is placed in the key information and managed.

Figure 6:
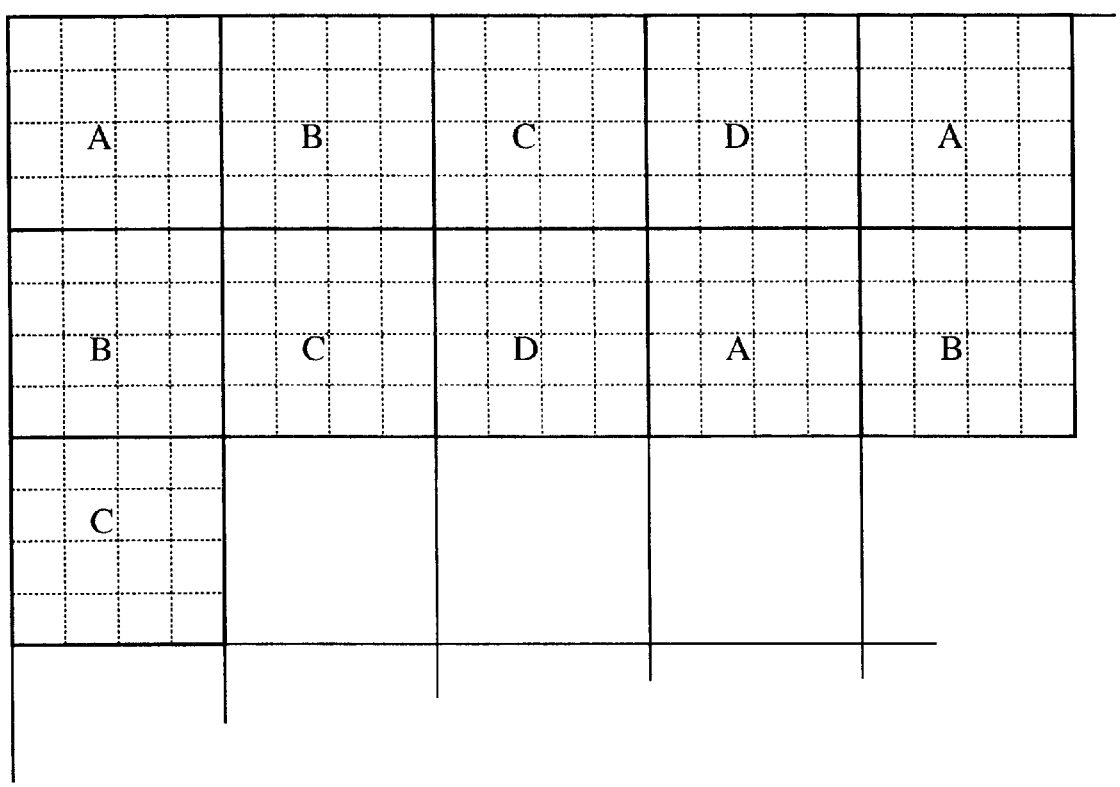
FIG. 6 shows an example of blocks in which additional information is embedded.
Figure 7:
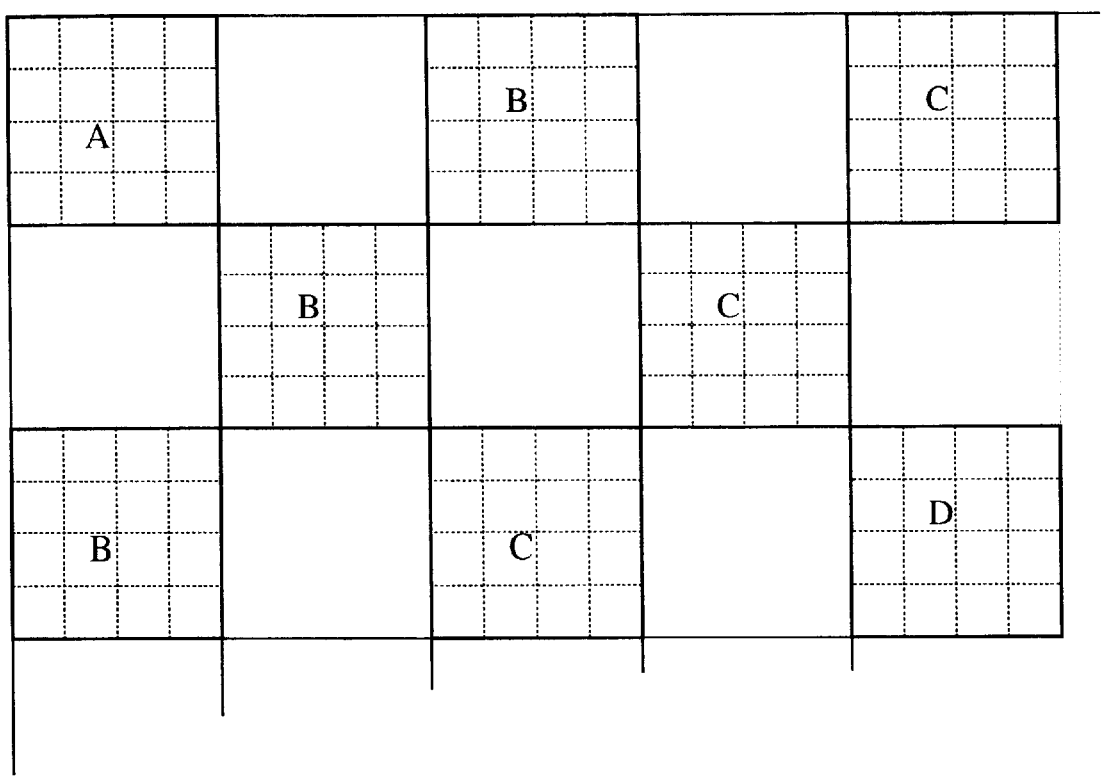
FIG. 7 shows another example of blocks in which additional information is embedded.

It is assumed that image data is arranged into 4×4 blocks, and that the respective pixel arrangements are applied. The respective patterns are called "mask patterns". By varying the mask patterns shown in FIGS. 5A, 5B, 5C, and 5D in sequence as shown in FIGS. 6 and 7 in order to vary the corresponding pixel, decryption can be made difficult. The complexity can be increased further by using random-number data. It is assumed that the random-number values are normalized within the number of these mask patterns and can be reproduced during detection. In the method for generating such random numbers, it is assumed that the same value is used during embedding and during detection, and that the initial value is passed as key information. For the method for embedding watermark information within these mask patterns, the above-described method is employed.

Fifth Embodiment

The method for determining mask patterns differs slightly between when image data on which processing is to be performed is obtained as data in a real space and when it is obtained as data in a spatial-frequency space. In the case of the real space, since rewriting of the image data is periodically performed, it is preferable that repetitive periodic patterns become invisible to the eye. It is known that, generally, from the point of view of human vision, very small changes in a portion where changes of the image data changes sharply are difficult to detect. Therefore, (1) watermark information is embedded into a block in which the difference Δ between the maximum value $X_{max}$ and the minimum value $X_{min}$ of the image data within the block is greater than a predetermined threshold value p, and
(2) when the difference Δ is smaller than the predetermined threshold value p, watermark information is not embedded into the block, and it is skipped.

Figure 8:
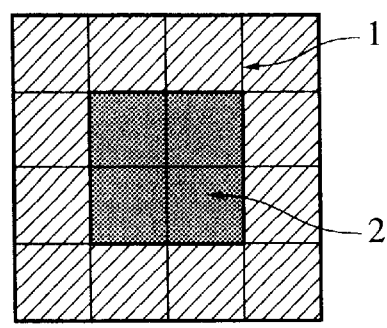
FIG. 8 illustrates an example of the determination of a block in which additional information is embedded.
Figure 9:
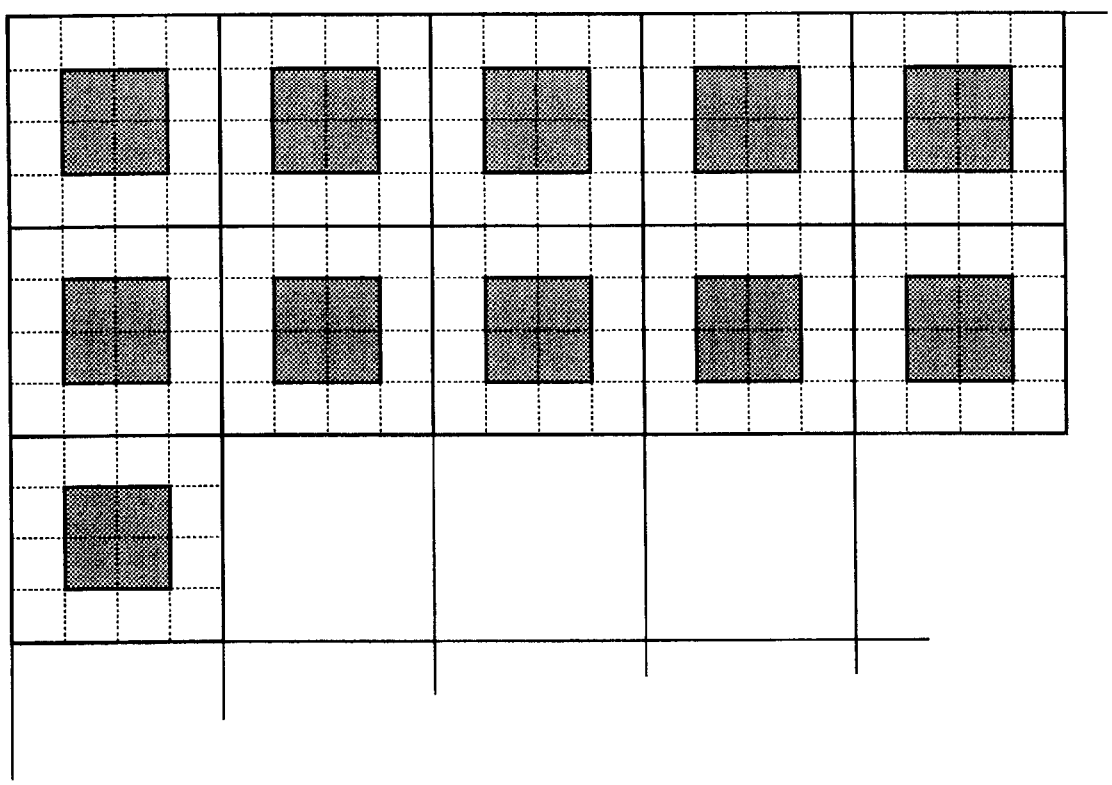
FIG. 9 illustrates another example of the determination of a block in which additional information is embedded.

By performing writing on the basis of the above rules, deterioration in image quality is not visible from the point of view of visual characteristics. In a case in which this determination is performed, in practice, in a block composed of a plurality of pixels and the image data is increased or decreased on the basis of the embedding information in the block, since the image data vary, a malfunction may occur during detection. That is, as a result of the distribution of the difference D among the pixels on the basis of the embedding information with respect to the data in the vicinity of a threshold value in the determination, the data varies, and a case may occur in which the determination is different during detection time. Therefore, it is necessary to spatially separate determination pixels from application pixels. In FIG. 8, the 12 peripheral pixels 1 are used as determination pixels, and the four central pixels 2 are used as application pixels. Generally, when the density variation is larger in the peripheral pixels, it is expected that the density variation is larger also in the central pixels. Since the peripheral pixels 1 themselves are not affected by data variations by embedding, the determination is always performed correctly also during detection time. FIG. 9 shows a case in which two-dimensional image data is divided into 4×4 blocks, and applied to each block. Using the above-described determination, watermark information is embedded bit-by-bit into the corresponding block. The embedding method is the same as that of the above-described embodiment. For example, in a case in which a decimal value of 51 is embedded by assuming the embedding information to be the ID number of the owner of the image, and this decimal value 51 is represented in a binary as (110011). The bits 1, 1, 0, 0, 1, 1 are embedded sequentially into the corresponding block.

In contrast, for the embedding in the four central pixels, improvements in tolerance are achieved with respect to data variation due to noise and the addition of image processing as shown in the above-described embodiment. However, since a comparison with a threshold value is made in the peripheral pixels 1, a determination error occurs due to noise and image processing in the vicinity of the threshold value. However, this problem can be solved by the following method.

For the information of the values to be embedded, embedding is repeated M times for each bit. For example, in the above-mentioned embedding information (110011), if embedding is repeated five times for each bit, embedding is performed by the bit arrangement of [(11111) (11111) (00000) (00000) (11111) (11111)].

Detection of watermark information is performed by the following method.

(1) Detection of watermark information is performed in a block in which the difference Δ between the maximum value $X_{max}$ and the minimum value $X_{min}$ of the image data within the determination pixel group is greater than a predetermined threshold value p+q.
(2) When the difference Δ is smaller than the predetermined threshold value p+q, detection of the watermark information is not performed with respect to the block, and is skipped.

Here, the value q is the amount of an error which occurs due to noise and generally takes a positive value. For example, if it is assumed that a 1-bit (±1) error is mixed into the image data due to noise, a numerical value of p+2 is applied. As a result, the determination during detection time is as described below.

(1) The block which is not detected in the determination during embedding time and which is skipped is not absolutely detected during detection time.

(2) The block which is applicable in the determination during embedding time has a portion which is not detected during detection time.

From the above, the embedding information [(11111) (11111) (00000) (00000) (11111) (11111)] varies, due to the influence of noise or the like, to, for example, (111111111000000000111111111) after detection. If it is assumed that one block or more among five blocks is not influenced by noise, five continuous bits may become four bits due to noise. Accordingly, the codes are delimited first at the change point as follows: [(111111111) (000000000) (111111111)]. Then, if these are delimited sequentially in the order of five bits and four bits, finally, an embedding code sequence (110011) is obtained from [(11111) (1111) (00000) (0000) (11111) (1111)]. If the embedding information is assumed to be (111111), a total of 30 bits of "1" will be embedded in a similar embedding method. In order that this be detected correctly, if it is assumed that detection is possible when there is a quantity of three continuous bits, an error incidence may be of a degree in which a determination error in one block occurs for in every three blocks. With 6 bits being embedded (in six blocks), there can be up to two errors. That is, determination is possible with 28 of the continuous 30 bits of "1". In this manner, also in the determination, this method has strong tolerance with respect to errors and various processing.

In the selection of peripheral determination pixels, all the 12 pixels need not be objects. This selection is determined on the basis of the allowable extent of the computation accuracy and the calculation time. For example, two pixels are selected from each edge of a rectangular block, and peripheral pixels to be determined can be selected from a total of eight pixels. This makes it possible to reduce the amount of calculation for determination. It is a matter of course that the same pixels must also be used during detection time.

Sixth Embodiment

Figure 10:
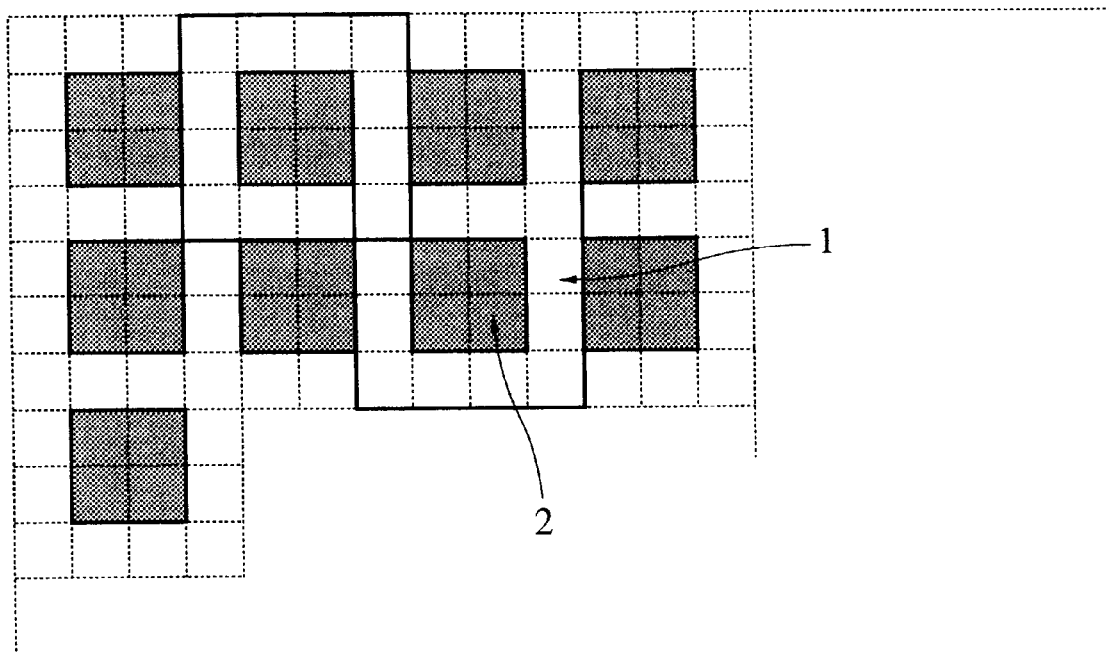
FIG. 10 illustrates still another example of the determination of a block in which additional information is embedded.

Although in the above-described embodiment, blocks do not overlap with each other, as shown in FIG. 9, in this embodiment, as shown in FIG. 10, adjacent blocks overlap with each other. The peripheral pixels 1 for determination are shared with the adjacent blocks, the distance to the neighbor of the embedding blocks 2 is shorter, and the number of pixels on which embedding is to be performed is increased. Therefore, not only can more information than in the fifth embodiment be embedded, but also the determination result can be shared and the amount of calculation is reduced.

Seventh Embodiment

Figure 11:
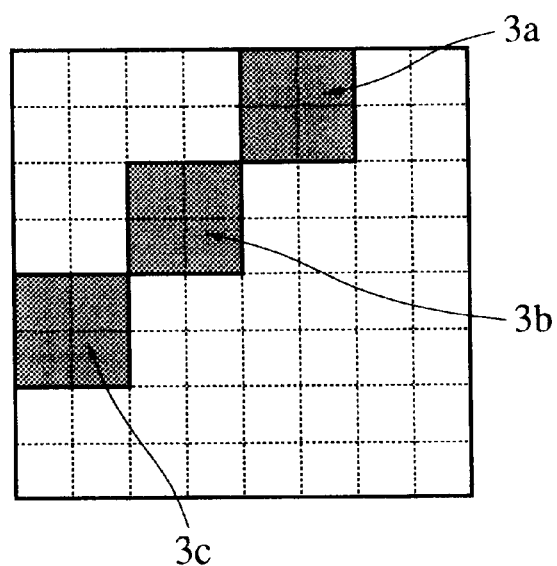
FIG. 11 shows several peripheral areas in which additional information is embedded.

FIG. 11 shows embedding into a DCT (discrete cosine transform) space. The DCT is a well known method in JPEG compression, which is a still image compression standard, and in MPEG compression, which is a moving image compression standard, in which DCT is performed on 8×8 blocks and converted into 8×8 frequency spaces. For this reason, embedding is performed into this spatial-frequency space. In FIG. 11, it is assumed that the position of the upper left portion indicates the value of DC (direct current) components, and the further to the right or to the bottom, the higher the frequency becomes. The watermark information to be embedded must be embedded in the vicinity of an edge of an image so that the watermark information is difficult to be visually detected. This means that the watermark information is embedded in higher frequency regions in terms of spatial frequencies. However, in compression characteristics, there is a tendency for the higher frequency components of the image to be monotonously decreased, and all low values are set to 0 so as to increase the compression ratio. If too high frequencies are used as a target, the watermark information cannot be embedded because most of the data are 0. Accordingly, in this embodiment, spatial-frequency components of a relatively middle degree are selected. The embedding pixels 3a, 3b, and 3c in FIG. 11 are each an embedding area in units of four pixels, and, for example, information in units of one bit can be embedded by the method of the first and second embodiments. Therefore, in FIG. 11, it is possible to embed 3-bit information in one DCT block. Here, the spatial-frequency components may contain negative numbers unlike image data values. In this case, by converting all into positive numbers by obtaining absolute values, it is possible to perform embedding in a manner similar to the case of the image data in real space as described above.

Next, a further description is given of an embodiment in which a spatial area or a spatial-frequency area as image data is divided into a determination area and an embedding area. Information is embedded only in an embedding area in which deterioration in image quality is regarded to be small on the basis of the determination result of the determination area. In such an embodiment, by adaptively performing an embedding operation according to the image quality, deterioration can be reduced and tolerance can be improved. As a result, the method is simple and has the following features:

(1) Deterioration in image quality is small and tolerance is excellent.

(2) Since an amount of the features of an image are extracted and embedding is performed according to the amount, individual embedded position information need not be passed during detection time.

Hereinafter, an eighth and subsequent embodiments are described below.

Eighth Embodiment

FIG. 12A shows an eighth embodiment of the present invention, in which image data is divided into 3×3 blocks. The area 1 indicates pixels of the determination area, and X of the area 2 indicates the pixel of the embedding area. A determination is made as to whether or not an embedding operation should be performed on the value of the pixel X of the embedding image area 2 by a computation based on the values of the eight pixels a, b, c, d, e, f, g, and h of the area 1. The determination is performed by the following method.

(1) When the amount of image edge in the determination area is greater than a predetermined threshold value, this is determined to be an edge area, and embedding is performed.

(2) When the amount of image edge in the determination area is smaller than a predetermined threshold value, this is determined to be a flat portion, and embedding is not performed and is skipped.

Here, regarding the embedding area, tolerance is improved by setting the width h for requantization to be large as described above. Since a comparison with a predetermined threshold value is made in the determination area, a detection error occurs with respect to an output value in the vicinity of the threshold value. That is, a determination error occurs when a very small change is applied to the image data due to noise and the addition of image processing during detection time, causing the detection operation to be performed incorrectly. In this embodiment, such problems are solved by the method described below.

FIG. 13 shows bit distribution of the image data used for determination. It is assumed that the image data is an 8-bit monochrome image. It is assumed that this 8-bit data is separated into high-order M bits and low-order N bits, and that only the high-order M bits are used for the above-described determination. Therefore, the low-order N bits are discarded, and the image data of eight initial bits are requantized into image data of M bits. Since the determination as to the presence or absence of the above-described image edge is performed based on this M bit data, the image data is requantized by the width of the N bits and, generally, tolerance is improved.

Figure 14:
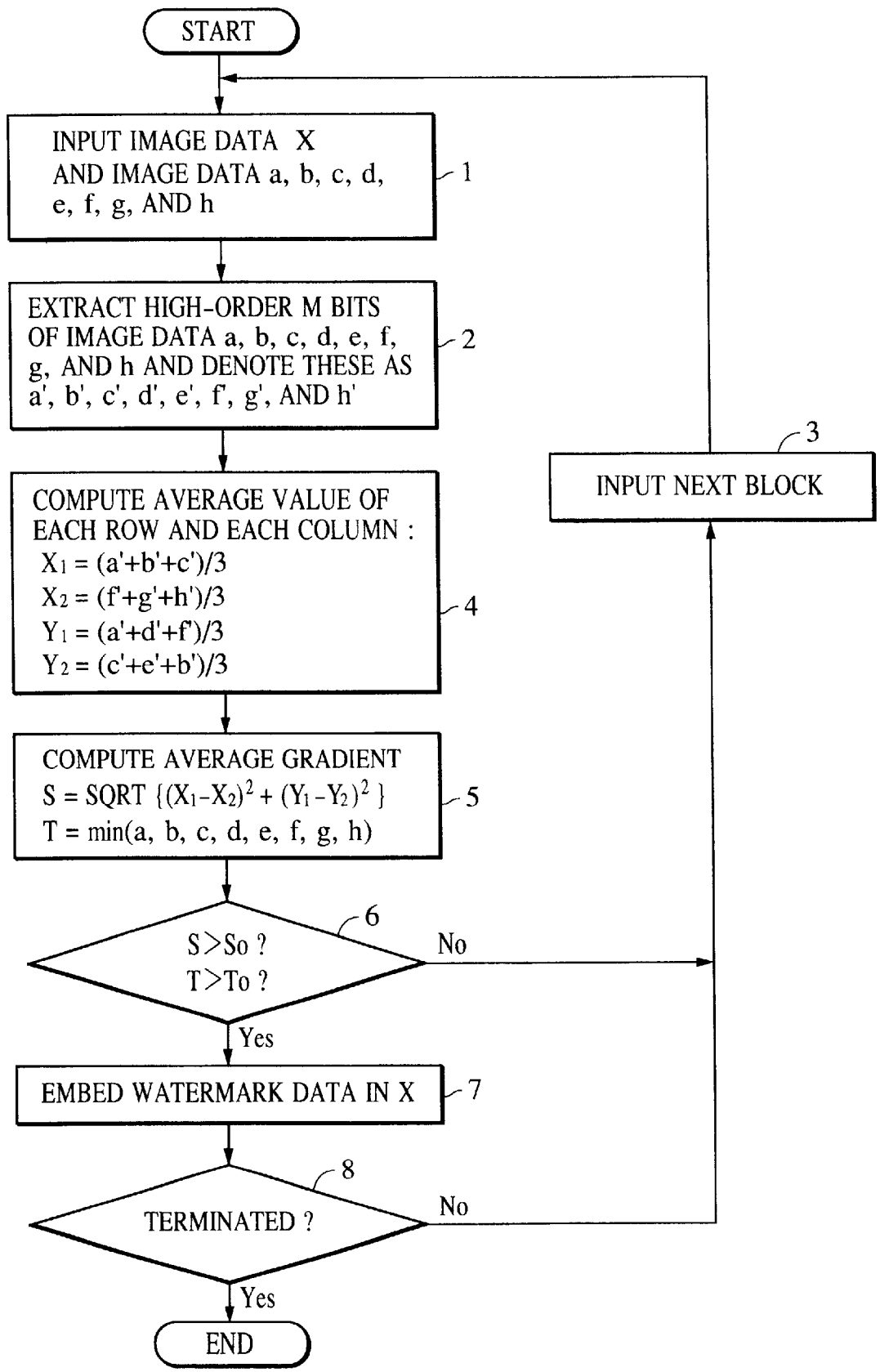
FIG. 14 is a flowchart showing the procedure of an embodiment of the present invention.

Referring to the flowchart of FIG. 14, the operation of this embodiment is specifically described by taking the data of FIG. 12B as an example.

In FIG. 12B, it is assumed that image data a, b, c, d, e, f, g, and h have the following decimal values:

as determination pixel data, a=180, b=120, c=70, d=138, e=50, f=90, g=80, and h=40, and as embedding pixel data, X=101.

Here, when each determination pixel data is represented in binary, then a=180=(101110100), b=120=(01111000), c=70=(01000110), d=138=(10001010), e=50=(00110010), f=90=(01011010), g=80=(01010000), and h=40= (00101000).

If it is assumed that M is four bits, by extracting the high-order four bits from the respective values, the following values are obtained after requantization: a'=11 =(1011), b'=7=(0111), c'=4=(0100), d'=8=(1000), e'=3=(0011), f'=5= (0101), g'=5=(0101), and h'=2=(0010).

By using such values after requantization, a determination as to whether the edge is present or absent is made in the determination steps 4, 5, and 6 of FIG. 14. Initially, in step 4 of FIG. 14, the average value of each row and each column in the X and Y directions is computed by the following equations:

$$X_1=(a'+b'+c')/3=(11+7+4)/3=7.33$$

$$X_2=(f'+g'+h')/3=(5+5+2)/3=4.0$$

$$Y_1=(a'+d'+f')/3=(11+8+5)/3=8.0$$

$$Y_2=(c'+e'+b')/3=(4+3+2)/3=3.0$$

From such values, based on step 5 in FIG. 14, a value of the average gradient S is obtained as follows: S=SQRT {$(X_1-X_2)^2+(Y_1-Y_2)^2$}, where SQRT indicates the square root. Here, if it is assumed that the value of the threshold value $S_0$ is set at 3.0 in the determination of step 6 in FIG. 14, S>$S_0$; therefore, this area is determined to be an image edge. This threshold value $S_0$ is an intensity parameter, which sets the determination tolerance. The larger this value, the more the error tolerance is improved. That is, this method becomes strong with respect to errors and image processing. On the other hand, the number of blocks in which embedding is to be performed is reduced, and much information cannot be embedded. A rational value is linked with the width h for requantization. If h=4, since embedding data may be varied in the low-order two bits, the high-order six bits of the data of the determination pixels may be extracted. That is, if the image data is eight bits, M=8−(the number of bits required for h) is assumed to be the value of M. This causes the value of M to be linked with the value of h, and need not be contained in a key which is passed as a parameter required for detection, and the system can be simplified.

Based on the above determination, in step 7, the value 101 of the image data X becomes a value in which watermark data is embedded. That is, when the embedding information is "0", the value is even-numbered, and the value is requantized to 104. When the embedding information is "1", the value is odd-numbered, and the value is requantized to 100.

The above operation is performed, for example, until it is finished (step 8) for all the images.

Here, the value of T in steps 5 and 6 in FIG. 14 prevents the value of the pixel X after the watermark is embedded from becoming a negative number. That is, T=min(a, b, c, d, e, f, g)=min(180, 120, 70, 138, 50, 90, 80, 40)=40. If $T_0$=4 is set, T>$T_0$, and therefore, embedding of the watermark is performed. Here, min(a, b, c, d, e, f, g) takes a minimum value of the values of a, b, c, d, e, f, g, and h.

FIG. 12C shows an example of another image data.

Assuming that M=4 in a manner similar to the above method, $$X_1=(a'+b'+c')/3=(7+7+4)/3=6.0$$

$$X_2=(f'+g'+h')/3=(8+5+8)/3=7.0$$

$$Y_1=(a'+d'+f')/3=(7+8+8)/3=23/3$$

$$Y_2=(c'+e'+b')/3=(4+7+8)/3=19/3$$

From such values, based on the calculation of FIG. 5, the average gradient S becomes:

$$S=SQRT\{(X_1-X_2)^2+(Y_1-Y_2)^2\}=5/3=1.67<S_0=3.0$$

Therefore, this block is not determined to be an edge of the image, and watermark data is not embedded. In the above way, electronic watermark embedding having strong tolerance with respect to determination and embedding can be performed.

Ninth Embodiment

In this embodiment, with respect to the image data in the determination area, the high-order M bits are not extracted, but, more generally, an attempt is made to requantize the image data by a width H. The width H for requantization in the determination area and the width h for requantization of embedding are generally independent of each other. The rule is:

(1) The image data in the determination area is requantized by a width H.

(2) The value is formed into an integer by discarding the decimal part.

(3) Edge determination is made by using this value.

(4) Embedding of watermark data is performed only when there is an edge, in a manner similar to the first embodiment.

A description is specifically given using the data of FIG. 12B. When the width H for requantization of the determination area is assumed to be 6, the data after being requantized becomes as described below (in decimal notation):

a'=30, b'=20, c'=11, d'=23, e'=8, f'=15, g'=13, and h'=6. In a calculation similar to the above, $$X_1=(a'+b'+c')/3=(30+20+11)/3=20.33$$

$$X_2=(f'+g'+h')/3=(15+13+6)/3=11.33$$

$$Y_1=(a'+d'+f')/3=(30+23+15)/3=22.67$$

$$Y_2=(c'+e'+b')/3=(11+8+6)/3=8.33$$

From such values, the average gradient S becomes:

$$S=\text{SQRT}\{(X_1-X_2)^2+(Y_1-Y_2)^2\}=16.92.$$

Here, the threshold value $S_0$ is an intensity parameter which sets determination tolerance similarly to that described above. When this value is set to be larger, error tolerance is improved. That is, the watermark embedding becomes strong against errors and image processing; on the other hand, the number of blocks in which data is to be embedded is increased, and much information cannot be embedded. If $S_0$ is set to a value of 10, $S>S_0$, and, determining this to be an edge, watermark information is embedded.

In the eighth embodiment, extraction of the high-order M bits of the data is the same as the requantization at a power of 2. Therefore, the first embodiment corresponds to a special case of the second embodiment. Since in the second embodiment, requantization is possible at a numerical value other than a power of 2, more detailed computation and wider handling are possible (on the other hand, an example of extracting the high-order M bits in the first embodiment is merely a bit manipulation of data, and this has the feature of being simple.) This requantization operation is only a calculation used for determination, and the actual image data is not directly rewritten. Therefore, the same method of computation needs only to be used during embedding and during detection, and the formation into an integer in determination (2) is not essential and rounding off may also be possible. The improvement in tolerance based on this requantization method may be said to be based on an operation for rounding into an integer value by this discarding and rounding-off method.

Figure 15:
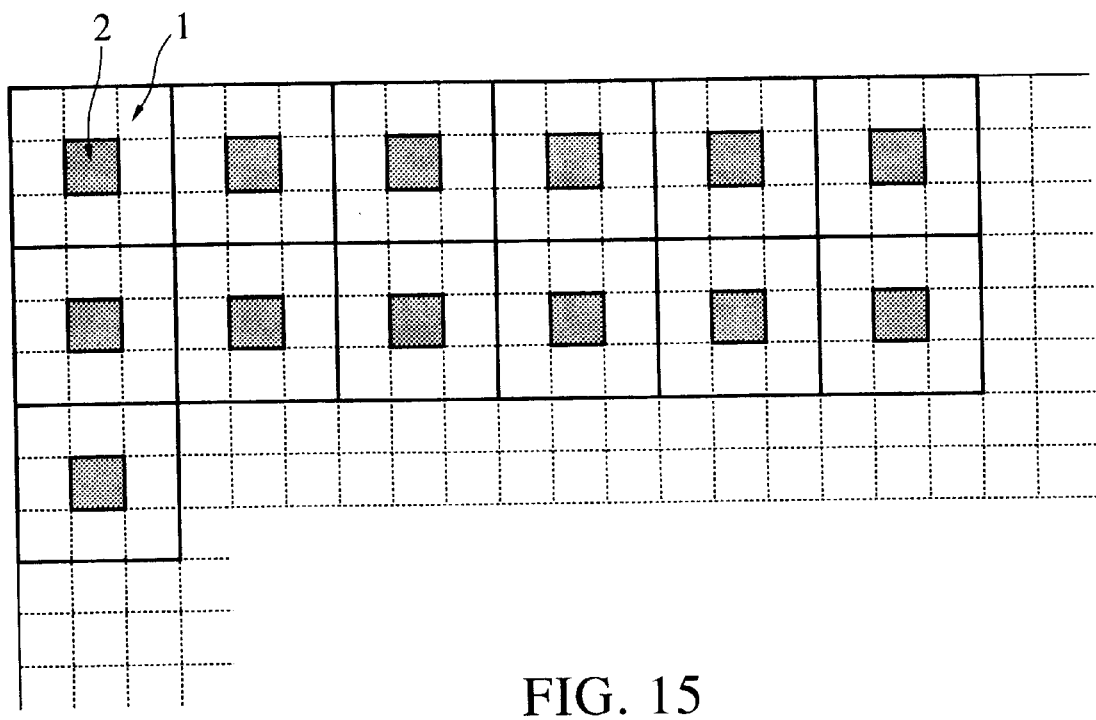
FIG. 15 illustrates an embedding method with respect to an image.

FIG. 15 shows a method for applying an embedding method in the eighth and ninth embodiments to an actual image. Referring to FIG. 15, reference numeral 1 denotes a determination area, and reference numeral 2 denotes an embedding pixel. In the embodiment shown in FIG. 15, image data is divided into 3×3 blocks and arranged in a lattice form. Based on the determination result in each block, embedding is performed or skipped.

Figure 16:
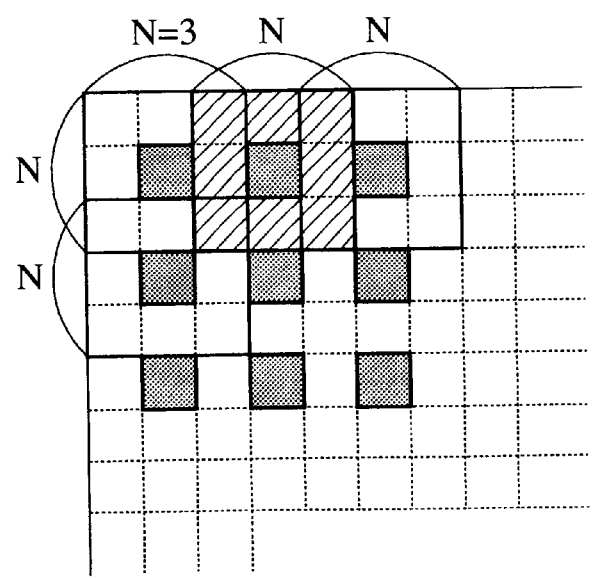
FIG. 16 shows a case in which determination areas of adjacent blocks in FIG. 15 overlap.

FIG. 16 shows a case in which determination areas of adjacent blocks are made to overlap with each other. In FIG. 16, since the values $X_1$, $X_2$, $Y_1$, and $Y_2$ in the calculation of an average value described in the eighth embodiment overlap in the neighboring blocks, it is possible to reduce the amount of computation because the value used in the previous block can be used and the number of pixels in which embedding is performed can be increased. As described above, in order to increase the determination tolerance, the width H for requantization must be set to be large, and as a result, the number of embedding candidates is decreased due to the determination. Therefore, the capability of taking a larger number of target blocks, as in FIG. 16, makes it possible to alleviate this problem.

Tenth Embodiment

Figure 17:
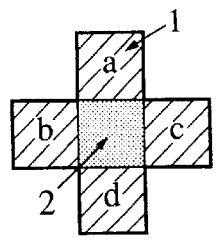
FIG. 17 shows an example in which the number of pixels of the determination area is four.

FIG. 17 shows a case in which the number of pixels of the determination area is decreased to four pixels, thereby realizing a larger number of embedding areas. The determination area 1 is composed of four pixels a, b, c, and d. The image data in the determination area is converted into a', b', c', and d' by the requantization method of the first and second embodiments. By using such values, the following is calculated to determine an edge:

$$S=\max(a', b', c', d')-\min(a', b', c', d')$$

When $S>S_0$, it is assumed that there is an edge. In the above equation, max(a', b', c', d') indicates the maximum value of data, and min(a', b', c', d') indicates the minimum value. Therefore, when the difference between the maximum value and the minimum value is large, it is determined that there is an edge.

Figure 18:
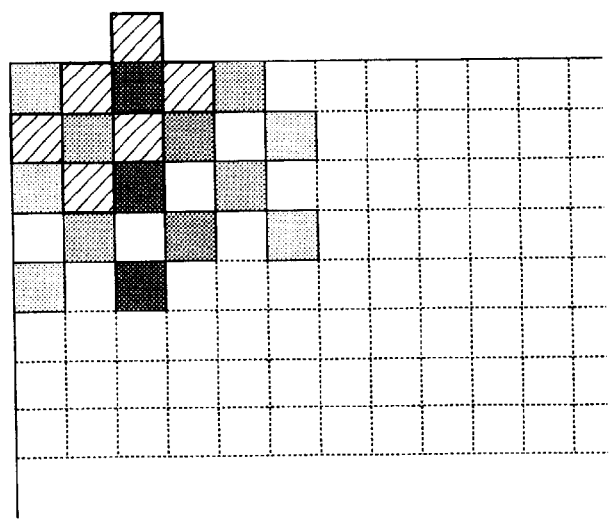
FIG. 18 shows a case in which the determination area of FIG. 17 is assigned to a two-dimensional image area.

FIG. 18 shows a case in which this block is used and applied to a two-dimensional image area, and by causing the determination areas of each cross-shaped block to overlap, it is possible to embed watermark information at a higher density.

Eleventh Embodiment

Figure 19:
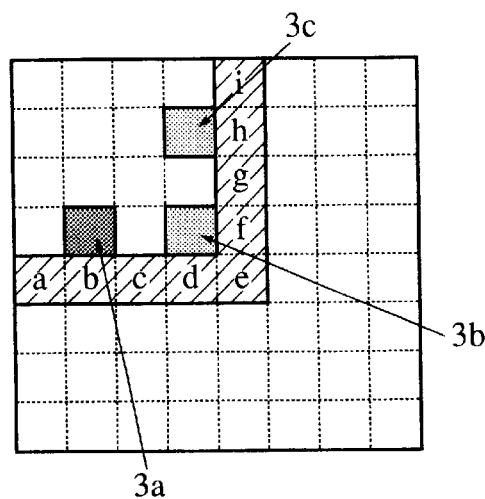
FIG. 19 illustrates another embodiment in which information is embedded into a DCT space.

FIG. 19 illustrates another embodiment in which information is embedded into a DCT (discrete cosine transform) space. The DCT is a well known method in JPEG compression, which is a still image compression standard, and MPEG compression, which is a moving image compression standard. In this embodiment, DCT is performed on 8×8 blocks and they are converted into 8×8 frequency spaces. An embedding operation is then performed in this spatial-frequency space.

In FIG. 19, it is assumed that the position of the upper left portion indicates the value of DC (direct current) components, and the further to the right or to the bottom, the higher the frequency becomes. The watermark information is embedded in the vicinity of an edge of an image in order to make the watermark information difficult to be visually detected. This means that the embedding information is embedded in higher frequency regions in terms of spatial frequencies. However, in compression characteristics, there is a tendency for the higher frequency components of the image to be monotonously decreased, and all low values are set to 0 so as to increase the compression ratio. If too high frequencies are used as a target, the watermark information cannot be embedded because most of the data are 0. Accordingly, in this embodiment, components of spatial frequencies of a relatively middle degree are selected. When specific frequency data is selected and the value is greater than a predetermined threshold value, it is determined that there is an image edge.

A description is given below of a method in which a determination operation is performed on the values of determination frequency components a, b, and c, and, based on the determination results, data 3a of a specific frequency component is used as an embedding target. The method is performed as described below.

(1) The values of frequency data a, b, and c in the determination area are requantized by a width H.

(2) Values a', b', and c' are obtained which are formed into integers by discarding the decimal parts of such values and by taking the absolute values thereof.

(3) Average data $S=\text{Ave}(a', b', c')=(a'+b'+c')/3$ is determined by these values.

(4) When S is greater than a threshold value $S_0$, watermark information is embedded into the data 3a of a specific frequency component.

It is assumed that the values a, b, and c are 8-bit data and have the values 120, −89, and 90, respectively. If the width H for requantization is 6, a'=20, b'=14, and c'=15, and S becomes 16.33. Here, the absolute value is taken. If the threshold value $S_0$ is set at 15, it is determined that there is an edge in this block, and watermark information is added to the data of the specific frequency component 3a.

The same operation is performed on frequency components d, e, and f. If it is determined that there is an edge, watermark information is written into the frequency component 3b. Hereafter, the same determination is also made with respect to frequency components g, h, and i. The result is performed on the specific frequency 3c. In a manner as described above, watermark information of a maximum of three bits is written into one DCT block.

Twelfth Embodiment

Figure 20:
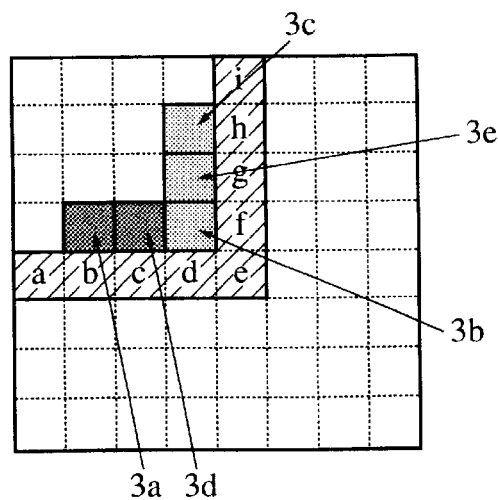
FIG. 20 illustrates an example in which a specific frequency of embedding is increased over FIG. 19.

FIG. 20 shows a case in which specific frequencies 3d and 3e for embedding are added so that much more watermark information can be embedded into one DCT block. With respect to 3d, b, c, and d are used as specific frequencies. With respect to 3e, f, g, and h are used as specific frequencies. Therefore, in this case, 5-bit information is embedded into one DCT block.

In the above-described manner, in this embodiment, it is possible to embed additional security information into a digital image data without the image quality being considerably damaged. The features are that an embedding area and an area in which determination of embedding is made are separated, by requantizing image data or spatial-frequency data of the area in which determination of embedding is made by a width H for requantization or by extracting the high-order M bits of the data, determination with strong tolerance and embedding of watermark information are possible. The width H for requantization in the determination area and the width h for requantization of embedding are generally independent of each other, and these can take different values. In this case, in order to detect the embedded information, both of (H, h) are required as key information to be passed. However, since both are parameters representing tolerance, it is also possible to set H=h. At this time, it is a matter of course that only H may be passed as the key information.

Another Embodiment

The present invention may be applied to a system comprising a plurality of apparatuses (for example, a host computer, an interface apparatus, a reader, a printer, etc.), or may be applied to an apparatus comprising one apparatus (for example, a copying machine or a facsimile apparatus).

Also, an embodiment is included within the scope of the present invention, in which program codes of software for realizing the above-described embodiment functions are supplied to a computer (CPU or MPU) within an apparatus or a system connected to various devices so that the various devices are operated to realize the additional information embedding function of the above-described embodiments, and the computer of the system or the apparatus causes the various devices to operate in accordance with the stored program.

In this case, the program codes of the software themselves realize the functions of the above-described embodiments, and the program codes themselves and a means, for example, a storage medium storing such program codes for supplying the program codes to a computer, constitute the present invention.

As storage media for storing such program codes, for example, floppy disks, hard disks, optical disks, optomagnetic disks, CD-ROMs, magnetic tape, non-volatile memory cards, ROMs, etc. may be used.

Not only in a case in which the functions of the above-described embodiments are realized by executing supplied program codes by a computer, but also in a case in which the functions of the above-described embodiments are realized by the program codes in collaboration with an OS (operating system) running in a computer or with another application software, it is a matter of course that such program codes are included in an embodiment of the present invention.

In addition, it is a matter of course that a case is also included in the present invention in which a CPU, which is provided in a function expansion board or in a function storage unit, performs a part or the entirety of actual processing in accordance with the instructions of program codes after the function expansion of the computer is stored in a memory provided in the function expansion unit connected to a board or a computer, and the functions of the above-described embodiments are realized by the processing.

According to the present invention, it is possible to improve tolerance and embed additional information in image data without deteriorating the image quality in comparison with that in the conventional case.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An image processing method for embedding additional information into image data, said image processing method comprising the steps of:

selecting a plurality of pixels or a plurality of spatial-frequency components into which additional information is to be embedded; and changing a data value of one or more of the selected plurality of pixels or plurality of spatial-frequency components in accordance with a value determined using data values of a counterpart plurality of pixels or plurality of spatial-frequency components in order to embed the additional information, wherein said value determined using data values of the counterpart plurality of pixels or spatial-frequency components is determined using, for each data value, a difference between the original data value and the result of requantizing the original data value by a predetermined step width.

2. An image processing method according to claim 1, wherein said additional information is distributed by using weighted addition among the selected plurality of pixels or plurality of spatial-frequency components.

3. An image processing method according to claim 1, wherein said additional information is distributed by using weighted addition and subtraction among the selected plurality of pixels or spatial-frequency components.

4. An image processing method according to claim 1, wherein said plurality of pixels or plurality of spatial-frequency components in which additional information is to be embedded is selected from spatially separate regions.

5. An image processing method according to claim 1, wherein a plurality of mask patterns which are set in advance are used in combination to select said plurality of pixels or plurality of spatial-frequency components to be embedded and said counterpart plurality of pixels or plurality of spatial-frequency components used to determine said value.

6. An image processing method according to claim 5, wherein the combination of said plurality of mask patterns is a periodic combination.

7. An image processing method according to claim 5, wherein the combination of said plurality of mask patterns is a reproducible combination by random numbers.

8. An image processing method according to claim 1, wherein said plurality of pixels or plurality of spatial-frequency components in which additional information is to be embedded and said counterpart plurality of pixels or plurality of spatial-frequency components used to determine said value are selected to be different from each other.

9. An image processing method according to claim 8, wherein said group of pixels; for determination are formed in such a manner as to surround the group of pixels for embedding.

10. An image processing method according to claim 9, wherein said group of pixels for determination overlap in part with adjacent pixels.

11. An image processing method according to claim 1, wherein one-bit embedding information is embedded in an embedding block composed of a plurality of pixels which are spatially separate, and detection is performed in such a way that the embedding information is identified from a set of detection results of such a plurality of pixels.

12. An image processing method according to claim 1, wherein said plurality of pixels or plurality of spatial-frequency components into which additional information is to be embedded and said counterpart plurality of pixels or plurality of spatial-frequency components used to determine said value are selected to be the same.

13. A storage medium for storing computer readable codes, said computer readable codes being executable by a computer for performing an image processing method for embedding additional information into image data, said image processing method comprising the steps of:

selecting a plurality of pixels or a plurality of spatial-frequency components into which additional information is to be embedded; and changing a data value of one or more of the selected plurality of pixels or plurality of spatial-frequency components in accordance with a value determined using data values of a counterpart plurality of pixels or plurality of spatial-frequency components in order to embed the additional information, wherein said value determined using data values of the counterpart plurality of pixels or spatial-frequency components is determined using, for each data value, a difference between the original data value and the result of requantizing the original data value by a predetermined step width.

14. A storage medium according to claim 13, wherein said medium is at least one of a CD-ROM, a magnetic tape, a non-volatile memory card, and a ROM.

15. An image processing apparatus for embedding additional information into image data, said image processing apparatus comprising:

means for selecting a plurality of pixels or a plurality of spatial-frequency components into which additional information is to be embedded; and means for changing a data value of one or more of the selected plurality of pixels or plurality of spatial-frequency components in accordance with a value determined using data values of a counterpart plurality of pixels or plurality of said spatial-frequency components in order to embed the additional information, wherein said value determined using data values of the counterpart plurality of pixels or spatial-frequency components is determined using, for each data value, a difference between the original data value and the result of requantizing the original data value by a predetermined step width.

16. An image processing apparatus according to claim 15, wherein said additional information is distributed by using weighted addition among the selected plurality of pixels or spatial-frequency components.

17. An image processing apparatus according to claim 15, wherein said additional information is distributed by using weighted addition and subtraction among the selected plurality of pixels or spatial-frequency components.

18. An image processing apparatus according to claim 15, wherein said plurality of pixels or plurality of spatial-frequency components in which additional information is to be embedded is selected from spatially separate regions.

19. An image processing apparatus according to claim 15, wherein a plurality of mask patterns which are set in advance are used in combination to select said plurality of pixels or plurality of spatial-frequency components into which additional information is to be embedded and said counterpart plurality of pixels or plurality of spatial-frequency components used to determine said value.

20. An image processing apparatus according to claim 19, wherein the combination of said plurality of mask patterns is a periodic combination.

21. An image processing apparatus according to claim 19, wherein the combination of said plurality of mask patterns is a reproducible combination by random numbers.

22. An image processing apparatus according to claim 15, wherein said plurality of pixels or plurality of spatial frequency components into which additional information is to be embedded and said counterpart plurality of pixels or plurality of spatial-frequency components used to determine said value are selected different from each other.

23. An image processing apparatus according to claim 22, wherein said group of pixels for determination are formed in such a manner as to surround the group of pixels for embedding.

24. An image processing apparatus according to claim 23, wherein said group of pixels for determination overlap in part with adjacent pixels.

25. An image processing apparatus according to claim 15, wherein one-bit embedding information is embedded in an embedding block composed of a plurality of pixels which are spatially separate, and detection is performed in such a way that the embedding information is identified from a set of detection results of such a plurality of pixels.

26. An image processing method according to claim 15, wherein said plurality of pixels or plurality of spatial-frequency components into which additional information is to be embedded and said counterpart plurality of pixels or plurality of spatial-frequency components used to determine said value are selected to be the same.

* * * * *